US010585923B2

(12) United States Patent
Du et al.

(10) Patent No.: US 10,585,923 B2
(45) Date of Patent: Mar. 10, 2020

(54) GENERATING SEARCH KEYWORD SUGGESTIONS FROM RECENTLY USED APPLICATION

(71) Applicant: International Business Machines Corporation, Armonk, NY (US)

(72) Inventors: Jun Yi Du, Ningbo (CN); Yue Liu, Ningbo (CN); Chuan Yang Wang, Ningbo (CN)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 15/496,443

(22) Filed: Apr. 25, 2017

(65) Prior Publication Data
US 2018/0307746 A1 Oct. 25, 2018

(51) Int. Cl.
G06F 7/00 (2006.01)
G06F 17/30 (2006.01)
G06F 16/33 (2019.01)
G06F 17/27 (2006.01)
G06F 16/951 (2019.01)
G06F 16/332 (2019.01)
(Continued)

(52) U.S. Cl.
CPC ........ *G06F 16/334* (2019.01); *G06F 16/3322* (2019.01); *G06F 16/90324* (2019.01); *G06F 16/951* (2019.01); *G06F 17/277* (2013.01)

(58) Field of Classification Search
CPC ............... G06F 16/3322; G06F 16/951; G06F 16/90324; G06F 16/334
See application file for complete search history.

(56) References Cited

U.S. PATENT DOCUMENTS 7,873,632 B2 1/2011 Wang et al.
8,527,533 B2 9/2013 Davis et al.
8,914,398 B2 12/2014 McCallum et al.
(Continued)

FOREIGN PATENT DOCUMENTS

CN 100530180 C 8/2009

OTHER PUBLICATIONS

Unknown, "List of web browsers", From Wikipedia, the free encyclopedia. Page last modified Mar. 12, 2017. Last accessed Mar. 15, 2017. https://en.wikipedia.org/wiki/List_of_web_browsers 12 pages.

(Continued)

*Primary Examiner* — Kannan Shanmugasundaram
(74) *Attorney, Agent, or Firm* — Robert J. Shatto (57) ABSTRACT

A computer provides search suggestions by capturing data from a first application, wherein the data includes data displayed on a screen by the first application. The computer segments the data from the first application into blocks. The computer extracts words from the data from the first application. The computer generates tokens of phrases and words using natural language processing tokenization. The computer scores the blocks based upon the data from the first application. The computer scores the tokens based upon the scoring of the blocks and the data from the first application. The computer detects a switch action from the first application to a second application, wherein the second application contains a search function. The computer provides the scored tokens to the search function of the second application.

18 Claims, 5 Drawing Sheets

(51) Int. Cl.
*G06F 16/9032* (2019.01)
*G06F 17/00* (2019.01)

(56) References Cited

U.S. PATENT DOCUMENTS

| | | | |
|---|---|---|---|
| 2003/0061200 A1* | 3/2003 | Hubert | G06Q 30/0601 |
| 2007/0276829 A1* | 11/2007 | Wang | G06F 16/951 |
| 2009/0049029 A1* | 2/2009 | Choi | G06F 16/951 |
| 2009/0157653 A1 | 6/2009 | Herlocker et al. | |
| 2010/0174992 A1* | 7/2010 | Portman | G06F 9/451 |
| | | | 715/738 |
| 2013/0159298 A1* | 6/2013 | Mason | G06F 16/9535 |
| | | | 707/728 |
| 2014/0172892 A1* | 6/2014 | Schechter | G06F 16/9535 |
| | | | 707/758 |
| 2015/0154214 A1 | 6/2015 | Nordstrom et al. | |
| 2017/0083633 A1 | 3/2017 | Bosko et al. | |

OTHER PUBLICATIONS

Du, et al., "Generating Search Keyword Suggestions From Recently Used Application", U.S. Appl. No. 15/858,071, filed Dec. 29, 2017.
List of IBM Patents or Patent Applications Treated as Related. Filed Jan. 2, 2018. 2 pages.
Du et al., "Generating Search Keyword Suggestions From Recently Used Application," U.S. Appl. No. 16/387,602, filed Apr. 18, 2019, Accelerated Examination Support Document, U.S. Appl. No. 16/387,602, filed Mar. 18, 2019, 21 pages.
Accelerated Examination Support Document, U.S. Appl. No. 15/858,071, filed Dec. 19, 2017, 21 pages.
List of IBM Patents or Patent Applications Treated as Related, Apr. 16, 2019, 2 pages.

* cited by examiner

| App Name | Block Name | Block Coordinates | Tokens | Significance Level | Hit Count | Behavior Score | Block Score |
|---|---|---|---|---|---|---|---|
| Example App | Menu/Toolbar | (0,0) - (1920, 200) | File, Edit,... | 5 | 3 | 70 | 51.76 |
| Example App | Multi-Page Preview | (0,200) - (500, 1000) | Outline, Page 1.... | 3 | 1 | 35 | 27.53 |
| Example App | Main Body | (500,200) - (1500, 1000) | Sample Text, ... | 4 | 4 | 100 | 63.45 |
| Example App | First Image | (1500,200) - (1920, 600) | Image.jpg | 2 | 0 | 20 | 16.67 |
| Example App | Second Image | (1500,600) - (1920, 1000) | Logo | 1 | 0 | 25 | 15.83 |
| Example App | Status Bar | (0,1000) - (1920, 1080) | Error, 100%, ... | 6 | 2 | 110 | 75.06 |

GENERATING SEARCH KEYWORD SUGGESTIONS FROM RECENTLY USED APPLICATION

BACKGROUND

The present disclosure generally relates to keyword search improvement, and more specifically, to providing suggestions for keyword searching based upon a user's recent application use.

In many situations, a user will be using an application or program and discover something they wish to look up, find, or research. Current means for doing so include opening a different program (including an internet browser) and manually entering search terms corresponding to what they would like to find, or copying a search term from a source and pasting it into a search box or window in said different program.

SUMMARY

Disclosed herein are embodiments of a method and computer program product for providing search suggestions. A computer captures data from a first application, wherein the data includes data displayed on a screen by the first application. The computer segments the data from the first application into blocks. The computer extracts words from the data from the first application. The computer generates tokens of phrases and words using natural language processing tokenization. The computer scores the blocks based upon the data from the first application. The computer scores the tokens based upon the scoring of the blocks and the data from the first application. The computer detects a switch action from the first application to a second application, wherein the second application contains a search function. The computer provides the scored tokens to the search function of the second application.

Also disclosed herein are embodiments of a system for providing search suggestions. One or more processors located within a computing system, and in communication with a memory that is also located within a computing system are configured to capture data from a first application, wherein the data includes data displayed on a screen by the first application. The computing system segments the data from the first application into blocks. The computing system extracts words from the data from the first application. The computing system generates tokens of phrases and words using natural language processing tokenization. The computing system scores the blocks based upon the data from the first application. The computing system scores the tokens based upon the scoring of the blocks and the data from the first application. The computing system detects a switch action from the first application to a second application, wherein the second application contains a search function. The computing system provides the scored tokens to the search function of the second application.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to keyword search improvement, and more particular aspects relate to techniques for providing suggestions for keyword searching in an internet browser based upon a user's recent application use. While the present disclosure is not necessarily limited to such applications, various aspects of the disclosure can be appreciated through a discussion of various examples using this context. Aspects of the present disclosure can also be used with searches in any other application which offers a search function including word processors, pdf viewers, file directory programs, or search features of an operating system. The present disclosure can be used on any type of computer system which can run such an application including, but not limited to, personal computers, mobile phones, Internet of Things (IoT) devices, mainframes, servers, and/or devices in cloud computing environments.

In many situations, a user will be using an application or program (herein app) and discover something they wish to look up or research. Many possible reasons can prompt a user of an app to search for information. This can be a term the user is unfamiliar with, whether in their native language or another language, an error message which does not provide sufficient detail for a user to solve the error, a desire for additional functionality of the app they are using, or any other idea that the use of the program may inspire. Current means for searching include opening a different program (including an internet browser) and manually entering search terms corresponding to what they would like to find, or copying a search term from a source and pasting it into a search box or window in said different program. Many programs which offer a search function provide search suggestions when a user begins inputting search terms; however, these search suggestions may not relate to what the user is attempting to search for.

The present disclosure provides ways to improve a user's experience as they switch from using one app (a source app) to using another app (a destination app) when the destination app includes a search function, by providing search suggestions relevant to the content displayed by the source app and the user's behavior while using the source app. Embodiments presented herein provide for a tool which detects a user switching from a source app to a destination app and checks whether the destination app contains a search function. If the destination app does not, the tool is not further used. The tool can determine what the source app is and data from the source app can be captured for use by the tool. One form of data capture is a screen capture of the source app upon the user's switch. The captured data from the source app is segmented into blocks for further analysis.

Additionally, the tool extracts words from the captured data, which can occur through use of optical character recognition (OCR) and natural language processing (NLP). Using a NLP tokenizer, the tool can generate phrases or single words from the extracted words, which will be referred to herein as tokens. These tokens can be matched to the blocks in which they were displayed by the source app. Additional data captured from the source app is the user's behavior with the source app, including mouse movements, areas where the cursor rested, highlighted text, and clicks. The tool will also store significance data for each app and can retrieve that data for use in providing search suggestions. This significance data will include previously determined blocks for the source app and any "hotspots," meaning blocks which contained phrases/words which previously resulted in searches by a user.

Using the stored significance data and the user's behavior data, the tool can generate a score for the block. Additionally, the phrases/words in each block can be scored. Finally, the tool can provide the phrases/words, in order of score, to the search function of the destination app to display as search suggestions. The tool can also monitor which search terms the user uses. If a suggested search term is used, that data can be stored by the tool and be employed in determining hotspots for future uses of the tool.

Thus, aspects of the present disclosure improve a user's search experience by saving a user time in inputting a search into the destination app. Such time savings can be pronounced in instances where the user has a small or virtual keyboard and entering search terms would take longer than usual. The present disclosure also renders copying and pasting search terms from the source app into the destination app unnecessary as the tool will suggest the terms the user would have copied.

These enhancements to a user's search experience can be utilized through backend procedures such that the user is unaware of the tracking of the user's behavior and screen capture collection. Alternatively, a user can initiate the tool before using a source app and otherwise not have the tool running, such that their privacy can be safeguarded when desired. Similarly, the tool can be active by default and turned off or suppressed when privacy is desired.

The aforementioned improvements and/or advantages are example improvements and/or advantages. These improvements and/or advantages are a non-exhaustive list of example advantages. Embodiments of the present disclosure exist which can contain none, some, or all of the aforementioned advantages and/or improvements.

Figure 1:
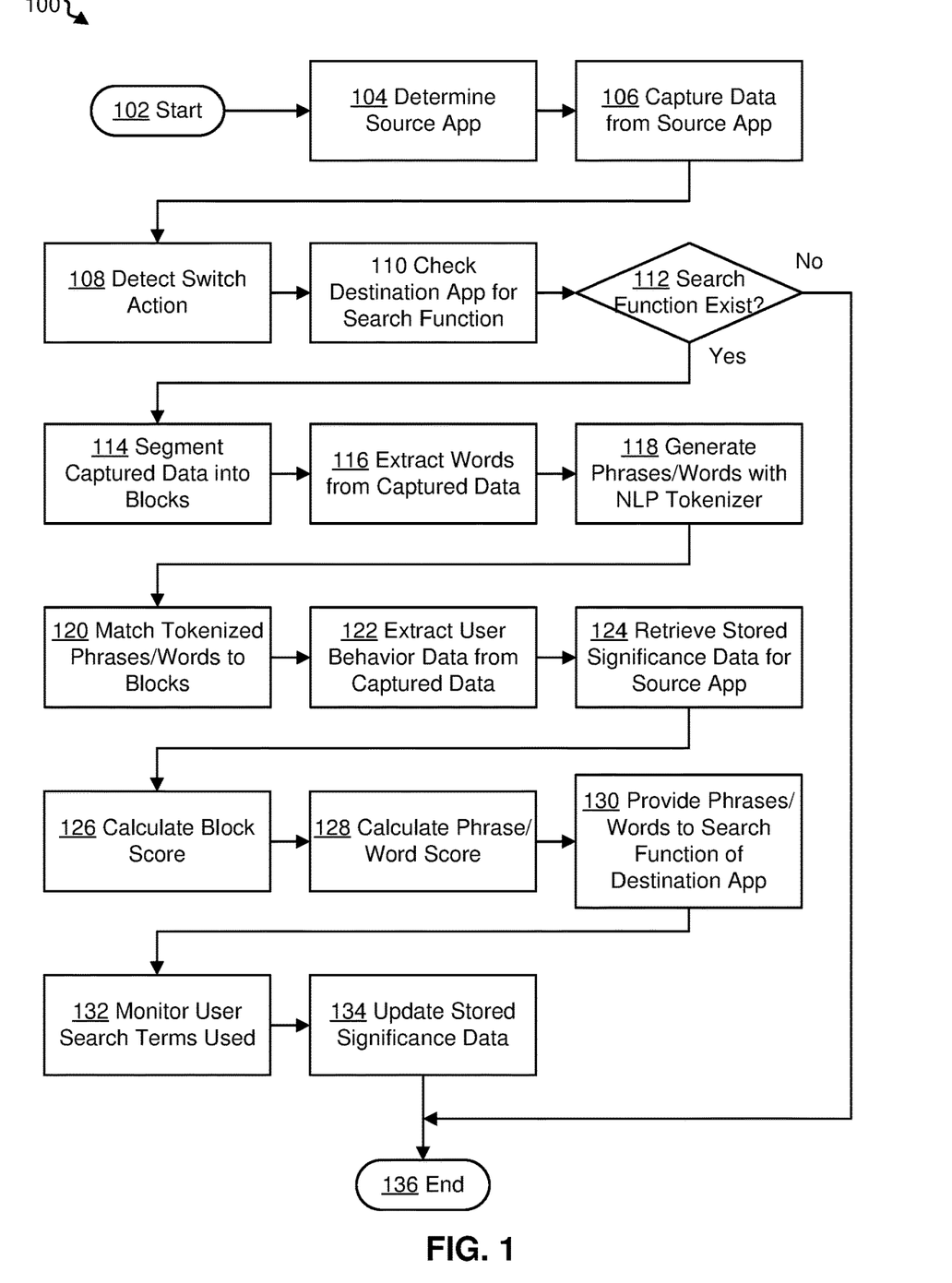
FIG. 1 depicts an example method for generating search keyword suggestions based on a recently used application, in accordance with embodiments of the present disclosure.

Referring now to FIG. 1, depicted is an example method 100 for generating search keyword suggestions based on a recently used application, in accordance with embodiments of the present disclosure. Method 100 can include more or less actions than those depicted. Method 100 can include actions in different orders than those depicted. Method 100 can be performed by a tool operating on a user device (such as user device 200 depicted in FIG. 2 or user device 302 depicted in FIG. 3). The tool can take many forms, including an app, a browser plugin, a background process, or a system service running on the user's device.

From start 102, the tool determines the identity of the source app at 104. The tool can do so via a variety of means including checking the running processes on the user device, comparing the display of the source app with a repository of displays, and checking the program's contents for a file or program name. The tool can contain or access a list of source apps. Such a list of apps can be locally maintained on the user's device, be stored remotely and accessed via a network connection, or a combination of these alternatives. In the event a new source app is discovered, the tool can add that source app to such a list for future use.

At 106, the tool captures data from the source app. In various embodiments, this capture will take various forms. In some embodiments, this data capture can include capturing a screenshot of the current display for the source app as the user switches to a destination app. In other embodiments, the data capture can include capturing the source data for what the app is using. For example, a user using an internet browser can capture the source information for the webpage being displayed. The data capture can also include capturing the current version of a file being modified, such as a document being created or modified by a word processing program. The data capture can also take the form of data scraping, including screen scraping, to capture the data from the source app as it is presented. The tool can be capturing data from the source app continually until a switch action is detected.

The tool detects a switch action at 108. The tool can monitor which app is the active window on a user's device and detect when the active window changes. This can change if a user clicks on another open app window, returns to the desktop or a main menu, accesses a menu of other apps, opens a shortcut to another app, or any other means of opening or switching to another app. Any of these changes from a user using a source app to using a second app can be termed a switch action. In some embodiments, a user selecting or opening another tab or similar change in content within one app can additionally be termed a switch action. In such embodiments, the source app and the destination app can be the same app.

In some embodiments, the tool can also detect more than one switch action occurring in succession, which can occur if, for example, a user switches from a source app to a desktop to open a shortcut to a destination app. In such embodiments, these switch actions to an intermediate app or other intermediate location and then to a destination app can be treated the same as a single step switch action. The tool can employ time based or other criteria for determining if multiple switch actions should be treated as one switch action. For example, in some embodiments a tool can have a 60 second time window during which more than one switch action is treated as one switch action. In such example, if two switch actions occur within 30 seconds they can be treated as one switch action, but if they occur 5 minutes apart, they can be treated as separate switch actions.

At 110, the tool checks whether the destination app contains a search function. The tool can contain or access a list of apps with a search function. Such a list of apps can be locally maintained on the user's device, be stored remotely and accessed via a network connection, or a combination of these alternatives. The tool can contain instructions for determining whether a destination app contains a search function, which can include determining if the combination of keys "control" and "f" result in a search window, or if a search box exists in the app. The tool can also contain both instructions for determining such apps and maintain a list of apps with search functions, which is updated upon determining a new app contains a search function. Common destination apps including search functions include internet browsers, word processors, pdf viewers, file directory programs, and search features of an operating system. At 112, the tool determines whether the destination app contains a search function based on the check at 110. If the destination app does not contain a search function, method 100 ends at 136. If the destination app does contain a search function, method 100 proceeds to 114.

Figure 4:
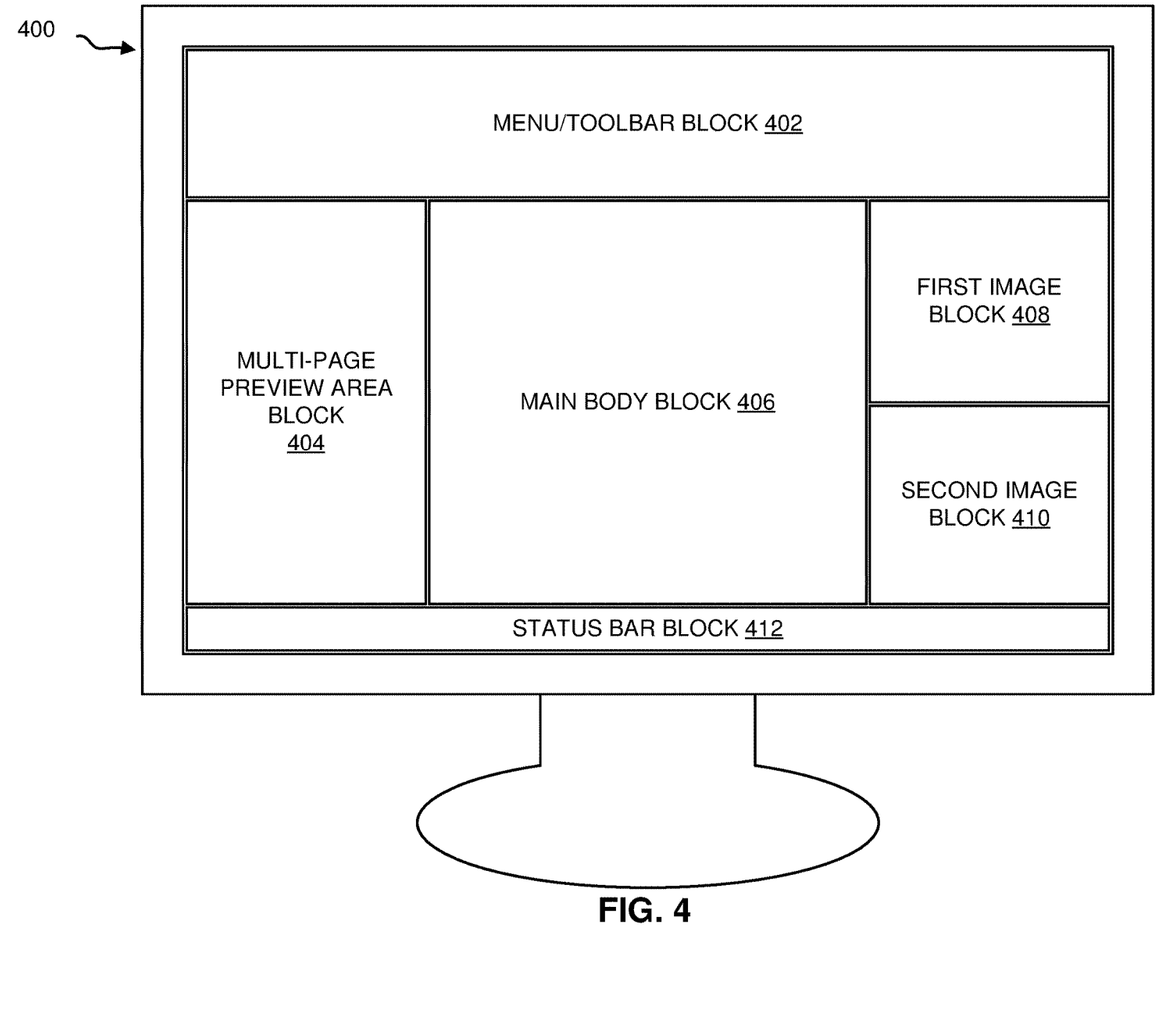
FIG. 4 illustrates an example computer screen segmented into blocks in accordance with embodiments of the present disclosure.

At 114, the tool segments the captured data into blocks. The form of these blocks will vary in embodiments and can depend on the form of the captured data. For example, data captured by screen capture can be segmented into blocks corresponding to the areas displayed visually on the screen and can occur using region technology. An example of such segmentation is depicted in FIG. 4 and discussed below. Such blocks can be constructed based upon visually similar areas such that a first block includes toolbars and menus, a second block includes summary or outline view areas, and a third block includes the main body of the app. The blocks can also correspond to images, banner areas, or separate paragraphs within a display. In some embodiments, data captured via source information can be segmented into one or more blocks for the body of the content, a block for metadata, and a block for hyperlinks or shortcuts. These examples of potential blocks are not to be read as limiting; many types of blocks can be envisioned and implemented in method 100.

A block's boundaries can be defined using a variety of means. Possible examples include using coordinates on a screen in terms of pixels or relative locations. For example, on a monitor or display that is 1920 pixels wide, a block which corresponds to the top 100 pixels of the display can be expressed as covering a rectangle of space between pixels (0, 0); (1920, 0); (0, 100); and (1920, 100). These coordinates can be expressed in a variety of forms in embodiments. The same example rectangle can be expressed as from (0, 0) to (1920, 100), with the other two corners implied by this information. Alternatively, a block can be expressed as covering the distance from 0% of the screen height to 10% of the screen height, and from 0% of the screen width to 70% of the screen width. In another example, a second block can be described as covering the next 320 pixels in height using the same width as the first block. Using three or more pixel locations, blocks of alternate shapes can be constructed and used. Circular (or oval) blocks can also be constructed using a center pixel and a radius (or x and y radii). In some embodiments, blocks can partially or wholly overlap. The boundaries for data captured via source information can take the form of lines of code or text, word or character counts, or other forms. For example, a block of a webpage's source can be expressed as lines 14-33 or characters 103-468. These examples of block boundaries are not to be read as limiting; the many possible types of blocks can be expressed in many possible ways.

At 116, the tool extracts words from the captured data. This extraction of words can occur through use of a character recognition engine. In embodiments where the tool captured the data using a screenshot, words can be extracted through use of techniques including optical character recognition (OCR), optical word recognition, intelligent character recognition, or intelligent word recognition. In embodiments using other forms of data capture, the words can be extracted from the text of the source or document captured using a variety of techniques. Additionally, the tool can utilize natural language processing (NLP) to segment extracted characters into words by determining appropriate break points between recognized characters. In some languages and circumstances, this can be as simple as recognizing spaces between characters, but in others, the NLP employed by the tool can be more sophisticated to appropriately determine word boundaries. The extracted words can be saved to a list or library for further use in method 100 or other processes.

At 118, the tool generates phrases and words with a natural language processing (NLP) tokenizer. The tool can use the NLP tokenizer to group the extracted words, which can be found in a list or library stored at 116, into tokens of phrases or singular words. In various embodiments, different NLP tokenization methods can be utilized by the tool. The NLP tokenizer can determine whether words should be grouped into phrases, or not grouped, on the basis of hyphenation between words, common groupings between words in usages of the language, part of speech analysis, topic segmentation, sentence segmentation, morphological analysis, grammatical analysis, punctuation analysis, and/or any other relevant methods. The tokens in the form of phrases or singular words can be saved to a list or library for further use in method 100 or other processes.

At 120, the tool matches the tokens to the blocks in which the tokens are located. This can entail the tool creating separate lists of tokenized phrases and singular words for each block determined at 114.

At 122, the tool extracts user behavior data from the captured data from the source app. The extracted user behavior data can vary in form and amount collected in various embodiments. Possible types of user behavior data with the source app which can be extracted include where the user clicked or double clicked a mouse (or tapped a screen or touchpad), which (if any) words or characters a user highlighted, which areas of the display a user moved the mouse or cursor over, any items the user selected and dragged to another location, any scrolling actions performed by the user, where the mouse or other pointing device rested or stopped and how long it stopped there, or any other data which can indicate what a user was viewing or interacting with when using the source app. In systems with cameras, user behavior data can also include tracking a user's eye movements (or other movements) and correlating that information with which portion of the display the user viewed when using the source app.

At 124, the tool retrieves stored significance data for the source app, if any. The first time the tool is used with a source app, there may be no such stored data to retrieve and this action can be skipped. The stored significance data can be stored locally and comprise data generated by the user device the user is using. Alternatively, the retrieved stored significance data can be limited to data stored for a single user of such user device and correspond to the user currently logged-in or otherwise indicated as using the device at the time. In other embodiments, the stored significance data can be stored remotely and retrieved from that location. The stored significance data stored remotely can also be specific to a single user (of one or more devices), or can also include data generated by other users of the user device or other devices such that a larger body of stored significance data can be collected and used. In embodiments where block boundaries are defined by coordinates in pixels and data exists for more than one device, the values can be normalized such that displays using different pixel resolutions can be accommodated and compared appropriately.

Stored significance data for the source app can take many forms and can include many types of information. A possible example of data included in the stored significance data is the type of the application, meaning whether it is a browser, word processing application, email client, video game, or any other type indication the tool stores. Other data included can be defined priority areas for each source app or application type. Example priority areas include status bars, console/exception areas, error message windows, or other locations which can present information to a user that the user is more likely to need to search for.

Additional stored significance data can include previous determinations of blocks for the source app. These can be stored for various views of an app in cases of apps with multiple views, such as full screen modes, windowed modes, outline views, preview views, views with areas hidden from display, or any other views. For these stored determinations of blocks for various views, the blocks can have stored significance levels beyond or instead of the priority areas discussed above. These significance levels can similarly be based upon the likelihood that a user will be presented with content in these blocks that will be more likely to result in a search. The significance levels can be an ordered list where the lowest significance block has a significance of one, the second lowest has a significance of two, etc. until the highest significance block is reached. The significance levels can also be rated with a score out of 100 or any other possible number and multiple blocks can share identical scores in some embodiments. For these stored views of the source app, the stored significance data can include information on which blocks or which phrases or words previously resulted in a user searching for information once in a destination app. Blocks with high incidences of resulting searches can be termed "hotspots" or given any other designation. These blocks can be provided more importance or weight in scoring calculations discussed further below. Additionally or as part of the determination of hotspots, "hit counts" can be stored which are counts of how many times searches resulted from phrases or words in a block or for particular phrases or words. These examples of possible significance data to store for a source app are not to be construed as limiting and it is to be understood that other data can be used and stored as significance data.

At 126, the tool calculates a score for each block. The formula or algorithm for calculation of block scores will vary in embodiments, and will vary depending on the data collected and stored as discussed above. In some embodiments, a user behavior score can be calculated for each block as part of determining each block's score. A user behavior score can include assignment of value to each type of user behavior collected. For example, if the tool collected data regarding whether characters or words were highlighted or selected, the user behavior score can include values for how many times characters or words were highlighted or selected (or how many characters or words were highlighted or selected) for each block, with more highlighting or selecting resulting in a higher score for that block. These values can increase linearly with each highlight or selection, increase exponentially, be capped where a certain number of highlights or above results in a maximum score, or vary in any other form. Similarly, a user behavior score can include values for amounts or frequency of mouse clicks or double clicks, duration or distance of mouse moves, duration of mouse or cursor stoppage, or values relating to any other user behavior data collected. Certain user behavior can have more weight in the user behavior score than other user behavior. For example, a tool can prioritize word or character highlighting or selecting, as a user may be focused on those particular words or characters and need to search for information regarding what the user selected, while minimizing the importance of where a mouse or cursor rested. Aggregation of these various scores for a block via any arithmetic operation, with any weighting applied, can result in a single user behavior score for each block.

An example formula for creating a single user behavior score for each block could be: user behavior score=(number of highlights in a block)*50+(number of mouse clicks in a block)*20+(number of minutes of mouse movement in a block)*10+(number of minutes a mouse rested in a block) *5. In this example formula, the variables are added together and the numbers 50, 20, 10, and 5 are coefficients used to weight the respective variables. In this example, the coefficients place the highest weight on number of highlights, followed by number of mouse clicks, then number of minutes of mouse movement, and ending with the lowest weight on number of minutes a mouse rested in a block. In other embodiments, the coefficients can vary greatly and other variables can be included.

In some embodiments, the scoring of blocks can additionally be based on the stored significance data for the source app. If the stored significance data includes information on defined priority areas for the source app, the block or blocks that include the priority areas can be scored higher than blocks that do not. Similarly, if the stored significance data includes stored blocks for one or more views, the tool can compare the blocks created for this use of the tool with the stored blocks and determine which view and block configuration matches the current situation. Then if the blocks for that view have stored significance levels, the significance levels can be used in determining scores for the blocks in this use of the tool. The effect on the score of a significance level of a particular block can be relative to the significance levels of other blocks. Similarly, if a block in this use of the tool matches a block previously determined to be a hotspot, the score for that block can be increased accordingly. If the stored significance data includes hit counts for the number of prior times a block has included a phrase or word used for a search, the hit count of the block can be used in determining a score for the block. The effect on the score of a hit count of a particular block can be relative to the hit counts of other blocks. As with the user behavior data, these aspects of stored significance data can be aggregated together via any arithmetic operation and given different weights, including by use of weighting coefficients in a formula. For example, a block which has a high significance level could be given less weight than a block which is a hotspot or has a high number of prior hits.

The total score for each block can be based upon any or all of these pieces of information and the determination can vary considerably in embodiments. Combinations of user behavior scores and scores relating to stored significance data can be weighted as appropriate and/or normalized to generate a single score. One possible equation for calculating a score of a block is: block score=100*(block significance level)/(highest block significance level)*0.2+100*(hit count)/(total number of prior hits)*0.3+(user behavior score) *0.5. In this example formula, the first variable is the block's significance level as a percent of the highest block significance level, the second variable is the block's hit count as a percent of the total number of prior hits, and the third variable is the user behavior score discussed above. In this example formula, the numbers 0.2, 0.3, and 0.5 are coefficients used to weight these respective variables before adding together the variables. In this example, the coefficients place the highest weight on user behavior score, followed by percent of the total hit counts, and with the lowest weight on percent of the highest block's significance level. In other embodiments, the coefficients can vary greatly and other variables can be included.

At 128, the tool calculates a score for each tokenized phrase or singular word. The formula or algorithm for calculation of block scores will vary in embodiments, and will vary depending on the data collected and stored as discussed above. In some embodiments, the score for each token will be based in part on the block score determined at 126 for the block the token is matched with in operation 120. In addition to the token's block score, one or more scores relating to the token itself can be used to calculate a total score for the token. Possible scores relating to each token can include whether the token was highlighted or selected by the user (or in some embodiments if a part of the token was), whether the stored significance data indicates the token has previously been searched for, whether the mouse or cursor rested over the token (and in some embodiments the duration if it did), whether the user clicked on the token, or any other information stored or generated specific to the token or part of the token. Treatment of whether the stored significance data indicates the token has previously been searched for can vary in embodiments. In some embodiments, a tool can lower the score of such token due to a user being more likely to be searching for something new, but in other embodiments, a tool can increase the score due to the user needing more information about something they have previously searched. In embodiments where stored significance data includes data from other users, the fact that a token has previously been searched for can increase the score of such token as the user may be in need of the same information other users were.

The total score for each token can be based upon any or all of these pieces of information and the determination can vary considerably in embodiments. Combinations of block scores and scores relating to the token can be weighted as appropriate and/or normalized to generate a single score. The scores for data specific to a token can be aggregated together using any arithmetic function, including adding (or subtracting) to the block score or can serve as multipliers (or divisors) of a block score. Scores for data specific to a token can be added to a block score or multiplied by the block score to yield a higher result for variables which make a token more likely to result in a search, or can be subtracted from or the block score divided by them for variables which make a token less likely to result in a search. For example, the equation can include a term "selected" where the score is multiplied by 1 (unchanged) if the token was not selected, but multiplied by 1.2 if the token was selected. Similar multipliers can exist for the other possible token specific information. In other embodiments, a predetermined value (for example 50), can be added to the block score if a token was selected and if the token was not selected, there would not be any addition or there would be a subtraction. One possible equation for calculating a score of a token is: token score=(block score)*(selected)*(previously searched). For example, a token with a block score of 100 which was selected and had not previously been searched for could result in a score of 100*1.2*1, equaling 120, while a token in a block with a score of 70, which was not selected, but had previously been searched for could result in a score of 70*1*1.5 (with 1.5 being the multiplier for "previously searched" in this example), equaling 105.

At 130, the tool provides tokenized phrases and singular words to the search function of the destination app. The tool can organize the list or library of tokens in order of score, such that the tokens are arranged from highest to lowest score, or vice versa. The ordered list can be provided to the search function of the destination app in a method tailored to the destination app or a generalized method. In an example embodiment, a tool can be or can utilize a browser plugin that works with an internet browser to identify a search engine's input field. Then the browser plugin can provide the ordered list of tokens to a dropdown menu of search suggestions. The ordered list of tokens can be provided before, during, and/or after the user inputs a search string into the input field. As the user inputs a search string, a subset of the ordered list of tokens can be provided which match or contain the inputted search string. This can be accomplished using a browser plugin to modify the source code of the webpage displayed in the destination app by adding "<li>" tags into the existing tags. In other embodiments, the tool can provide a popup window containing the ordered list of tokens as search suggestions. The tokens in the ordered list can be converted into hyperlinks which when clicked, enter the token into the search function of the destination app.

At 132, the tool monitors the search terms used by the user. The tool can monitor whether the user selected one of the suggested tokens from the ordered list provided, and if so, which one. The tool can also monitor whether a different search term was used. This monitoring can occur via logging the user's keystrokes, capturing a screenshot of the search function of the destination app after the user has inputted the search string, determining if the user clicked on a suggested search term, or any other method which captures the user's search action.

At 134, the tool updates the stored significance data for the source app. This can include adding or changing entries to a table or database, increasing stored hit counts as appropriate, adding source or destination apps to a list or lists, and/or otherwise saving data created during the use of the tool. Many aspects of the information gathered and used in method 100 can be stored as significance data for the source app in the tool for future uses of the tool. Examples of information which can be stored as significance data are discussed above regarding operation 124. These include the type of the application, the blocks determined for the source app, whether the user used a token as a search term, and if a token was used as a search term, which token it was and which block it was located in. Any of the data generated through method 100 can be stored for future uses of method 100. After updating the stored significance data for the source app at 134, method 100 ends at 136.

In some embodiments, some or all of actions 114 through 128 can be performed before a switch action to a destination app is detected. In such embodiments, the tool can continuously or periodically perform any or all of the tasks depicted in 114 through 128 such that upon detection of a switch action, the tool requires less time or computational resources to provide the tokens to the search function of the destination app. If the tool performs the tasks depicted in 114 through 128 before detecting a switch action, it may update any of the generated data with each iteration of these tasks such that the most current data is available upon detection of a switch action.

Figure 2:
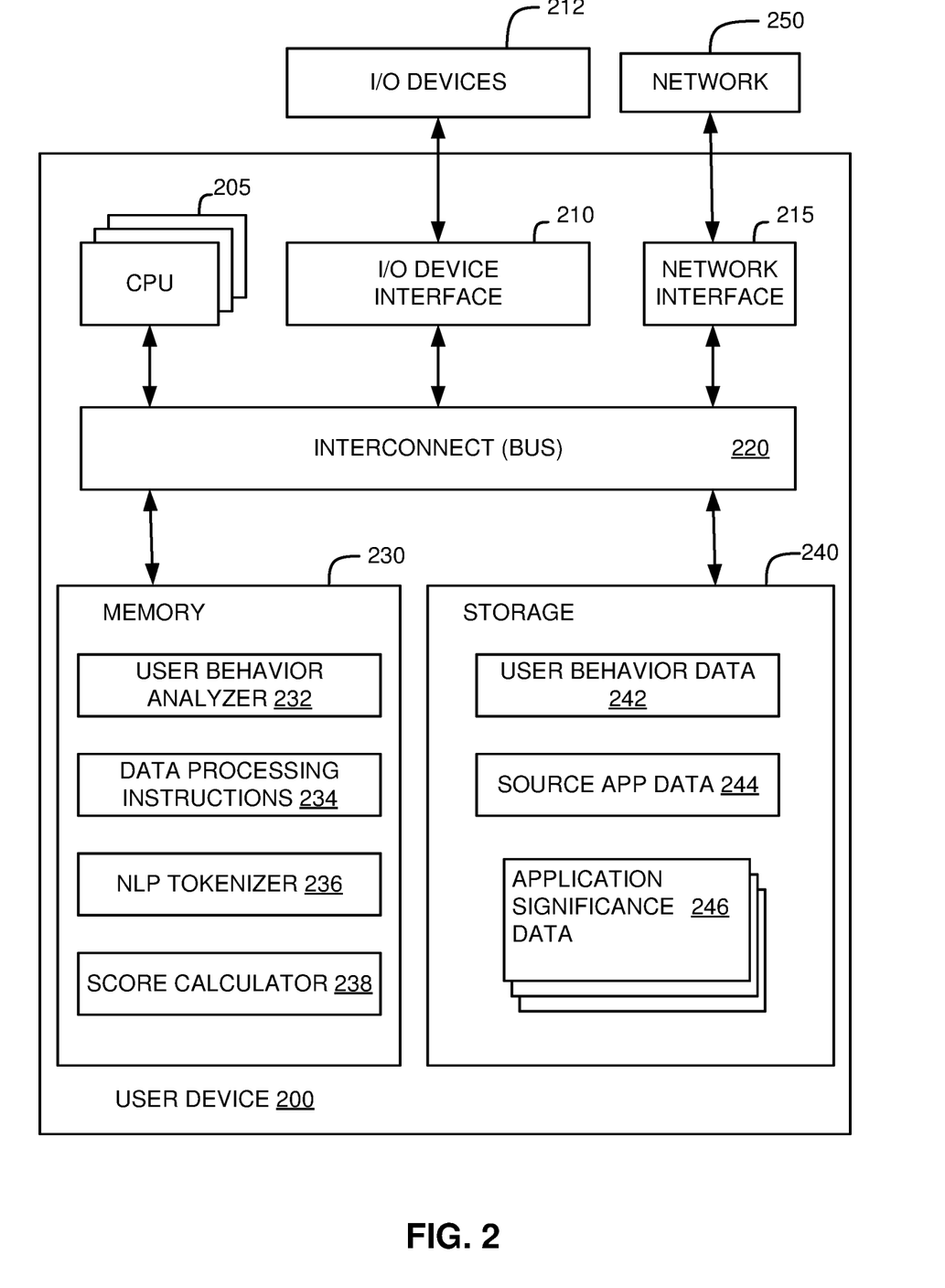
FIG. 2 illustrates a block diagram of a user device, in accordance with some embodiments of the present disclosure.

Referring now to FIG. 2, illustrated is a block diagram of a user device 200, in accordance with some embodiments of the present disclosure. In some embodiments, user device 200 performs operations in accordance with FIG. 1 as described above. The user device 200 can include one or more processors 205 (also referred to herein as CPUs 205), an I/O device interface 210 which can be coupled to one or more I/O devices 212, a network interface 215, an interconnect (e.g., BUS) 220, a memory 230, and a storage 240.

In some embodiments, each CPU 205 can retrieve and execute programming instructions stored in the memory 230 or storage 240. The interconnect 220 can be used to move data, such as programming instructions, between the CPUs 205, I/O device interface 210, network interface 215, memory 230, and storage 240. The interconnect 220 can be implemented using one or more busses. Memory 230 is generally included to be representative of a random access memory (e.g., static random access memory (SRAM), dynamic random access memory (DRAM), or Flash).

In some embodiments, the memory 230 can be in the form of modules (e.g., dual in-line memory modules). The storage 240 is generally included to be representative of a non-volatile memory, such as a hard disk drive, solid state device (SSD), removable memory cards, optical storage, or flash memory devices. In an alternative embodiment, the storage 240 can be replaced by storage area-network (SAN) devices, the cloud, or other devices connected to the user device 200 via the I/O devices 212 or a network 250 via the network interface 215.

The CPUs 205 can be a single CPU, multiple CPUs, a single CPU having multiple processing cores, or multiple CPUs with one or more of them having multiple processing cores in various embodiments. In some embodiments, a processor 205 can be a digital signal processor (DSP). The CPUs 205 can additionally include one or more memory buffers or caches (not depicted) that provide temporary storage of instructions and data for the CPUs 205. The CPUs 205 can be comprised of one or more circuits configured to perform one or more methods consistent with embodiments of the present disclosure.

The memory 230 of user device 200 includes user behavior analyzer 232, data processing instructions 234, NLP tokenizer 236, and score calculator 238. User behavior analyzer 232 can be processor-executable instructions for capturing information regarding a user's behavior with a source app. User behavior analyzer 232 can collect the examples of user behavior data discussed above regarding operation 122 of method 100.

Data processing instructions 234 can be processor-executable instructions for capturing and processing information from a source app that a user has switched from. The form of the data capture and data processing will vary in embodiments, but can include capturing data from the source app, segmenting the data into blocks, and extracting words from the captured data as discussed above regarding operations 112-116 of method 100. Data processing instructions 234 can output a list of blocks, a list of block boundaries, and a list or library of extracted words from the source app.

NLP tokenizer 236 can be processor-executable instructions for grouping words into tokens corresponding to phrases or singular words as discussed above regarding operation 118 of method 100.

Score calculator 238 can be processor-executable instructions for determining scores for blocks and for tokens as discussed above regarding operations 126-128 of method 100.

Storage 240 contains user behavior data 242, data from source app 244, and application significance data 246. User behavior data 242 can be the data gathered by user behavior analyzer 232. Source app data 244 is the information collected by data processing instructions 234 and can also include information derived from the source app data including the generated blocks, any OCR or other processing output of the source app, a list or library of the words extracted from the source app, and a list or library of tokens generated from the extracted data from the source app. Application significance data 246 can be information stored by the tool regarding source apps including names of source apps, types of source apps, previous determinations of blocks for source apps (in one or more views for each source app), whether any blocks are "hotspots," hit counts for blocks, previously used search terms, or any other data generated by the tool in previous uses of the tool. Further examples of application significance data are discussed above in regard to operation 124 of method 100.

In some embodiments as discussed above, the memory 230 stores user behavior analyzer 232, data processing instructions 234, NLP tokenizer 236, and score calculator 238, and the storage 240 stores user behavior data 242, source app data 244, and application significance data 246. However, in various embodiments, each of the user behavior analyzer 232, data processing instructions 234, NLP tokenizer 236, score calculator 238, user behavior data 242, source app data 244, and application significance data 246 are stored partially in memory 230 and partially in storage 240, or they are stored entirely in memory 230 or entirely in storage 240, or they are accessed over a network 250 via the network interface 215.

In various embodiments, the I/O devices 212 can include an interface capable of presenting information and receiving input. For example, I/O devices 212 can receive input from a user and present information to a user and/or a device interacting with user device 200.

Figure 3:
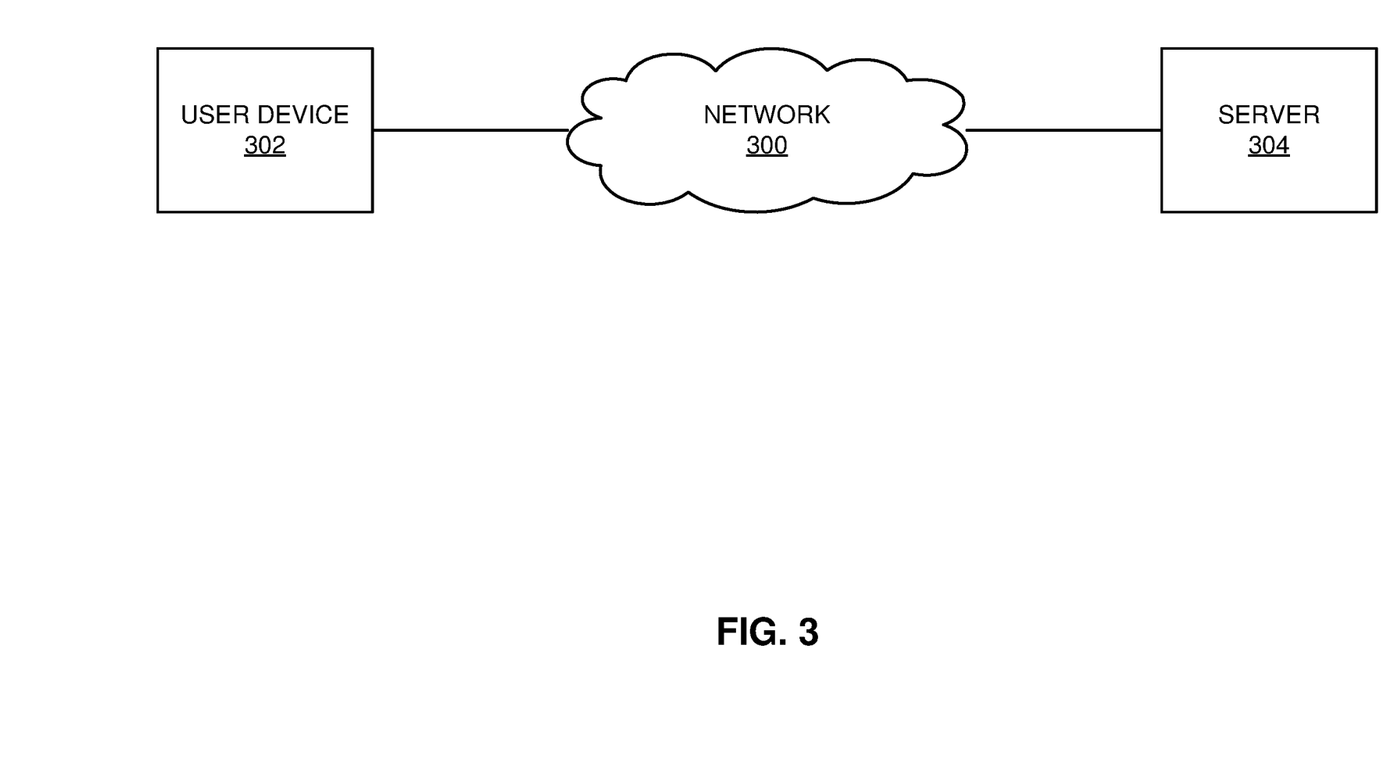
FIG. 3 illustrates a block diagram of a network in which some embodiments of the present disclosure can be implemented.

In some embodiments, the network 250 is consistent with network 300 as described with respect to FIG. 3. The network 250 can connect (via a physical or wireless connection) the user device 200 with other networks, and/or one or more devices (e.g., server 304 of FIG. 3) that interact with the user device.

Logic modules throughout the user device 200—including but not limited to the memory 230, the CPUs 205, and the I/O device interface 210—can communicate failures and changes to one or more components to a hypervisor or operating system (not depicted). The hypervisor or the operating system can allocate the various resources available in the user device 200 and track the location of data in memory 230 and of processes assigned to various CPUs 205. In embodiments that combine or rearrange elements, aspects and capabilities of the logic modules can be combined or redistributed. These variations would be apparent to one skilled in the art.

FIG. 3 illustrates a block diagram of network 300 in which some embodiments of the present disclosure can be implemented. Network 300 communicatively couples user device 302 to server 304 via a physical or wireless connection. Network 300 can be as large as the internet, or can be a smaller network such as a wide area network (WAN), metropolitan area network (MAN), an intranet for a company or other organization, or any other form of network. In some embodiments, user device 302 is consistent with user device 200.

User device 302 can contain within it the tool discussed above, and can perform method 100. In doing so, user device 302 can communicate with server 304 to retrieve any information stored remotely for use in method 100. Potential information stored remotely includes a list of apps that contain a search function for use in operation 106, a list of source apps for use in operation 110, and a collection of significance data for use in operations 124 and 134, whether that significance data relates to user device 302, the user of user device 302, multiple users of device 302, or multiple users of multiple devices (not depicted). In other embodiments, server 304 can contain the tool and perform the method remotely, including monitoring a user's activity on user device 302 for a switch action and user behavior data and performing the rest of the method upon determination of a switch action to a destination app with a search function.

FIG. 4 illustrates an example computer screen 400 segmented into blocks in accordance with embodiments of the present disclosure. The fact that the depiction of computer screen 400 is visually more similar to a desktop computer monitor should not be viewed as limiting. Furthermore, the exemplary segmented blocks are provided by way of example only. It is to be understood that implementations of the segmented blocks will vary based on the source app being segmented and can include other or different blocks than those depicted in the example of FIG. 4. Computer screen 400 can also take the form of a laptop screen, a mobile device screen, or any other form of computer screen. Computer screen 400 is shown displaying a source app segmented into menu/toolbar block 402, multi-page preview area block 404, main body block 406, first image block 408, second image block 410, and status bar block 412. This segmentation and generation of blocks 402-412 can occur as part of method 100 during operation 114.

These blocks can be constructed based upon visually similar areas and the content displayed within will vary with each use of the tool. Menu/toolbar block 402 can contain words such as file, edit, view, help, bookmarks, search, and/or various symbols. Multi-page preview area block 404 can contain summary information of the main body block and can be displayed as images or in an outline format. Main body block 406 can be the main area where content is displayed by the source app to the user and can contain multitudes of words and phrases. Image blocks 408 and 410 may contain no words or phrases or may contain words or phrases which require OCR for the tool to recognize the images as words or phrases. Additionally, image blocks 408 and 410 may contain words or phrases in the form of the filename of the images displayed in blocks 408 and 410. Status bar block 412 can contain messages from the source app to the user regarding activity taking place within the source app and may display error messages. In some embodiments, a tool can designate status bar block 412 as a priority block due to the nature of the content displayed therein.

Figure 5:
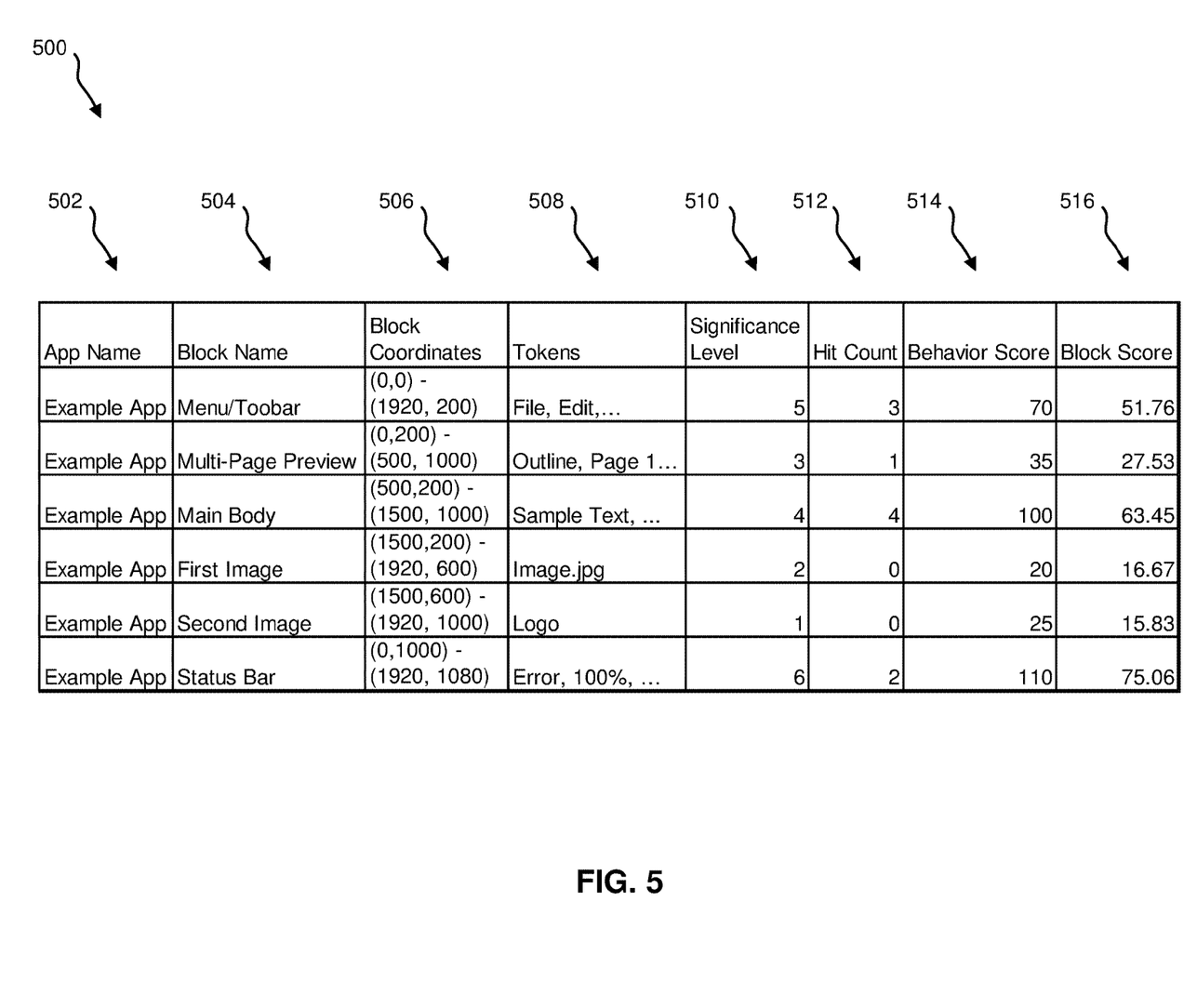
FIG. 5 depicts examples of blocks and their corresponding information in table form in accordance with some embodiments of the present disclosure.

FIG. 5 depicts block table 500 containing examples of blocks and their corresponding information in table form in accordance with some embodiments of the present disclosure. The tool can save all or part of block table 500 as significance data, whether in tabular form as shown, or any other form. Column 502 of block table 500 shows the app name corresponding to the blocks in the table. When the tool stores significance information relating to blocks, this information can be stored for future uses of the tool such that blocks corresponding to the app can be used in future uses of the tool. The significance information can be stored separately for each app, such that column 502 is unnecessary in some embodiments.

Column 504 shows a block name for each block. In some embodiments, the blocks may not be named, may be designated by a number or other unique identifier, or may be referred to simply by their coordinates or other boundary designation.

Column 506 shows block coordinates for each block. In other embodiments, the boundaries of blocks can be based on other features, including lines, characters, or words. The coordinates shown here are x-y coordinates with the upper left corner of a display being (0,0) and the lower right corner of a display being (1920,1080). Many other coordinate systems and screen sizes can be used.

Column 508 shows the tokens contained within each block. Column 508 is depicted with a few examples for each block, but in practice, blocks can contain any number of tokens.

Column 510 shows the stored significance level of each block. As shown, the significance levels range from one, the least significant block, to six, the highest significance block, with six significance levels because there are six blocks. In other embodiments, significance levels can be score based and/or two or more blocks can share the same score.

Column 512 shows the hit count for each block. The hit count refers to the number of times a token from a block has resulted in a user search in prior uses of the tool.

Column 514 shows a behavior score. This score can be created as part of operation 126 discussed in method 100.

Column 516 shows a block score. This score can be created as part of operation 126 discussed in method 100 and can be based in part on the behavior score in column 514.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for providing search suggestions, the method comprising:
    capturing, by a computer, data from a first application, wherein the data includes data displayed on a screen by the first application;
    segmenting, by the computer, the data from the first application into blocks, wherein the blocks correspond to areas displayed on the screen;
    extracting, by the computer, words from the data from the first application;
    generating, by the computer, tokens of phrases and singular words from the extracted words using natural language processing tokenization;
    retrieving, by the computer, stored significance data for the first application, wherein the significance data includes information used for determining respective blocks that will be more likely to result in a search;
    scoring, by the computer, the blocks based upon the data from the first application, wherein the scoring of the blocks is further based upon the stored significance data;
    scoring, by the computer, the tokens based upon the scoring of the blocks and the data from the first application;
    detecting, by the computer, a switch action from the first application to a second application, wherein the second application contains a search function; and
    providing, by the computer, the scored tokens to the search function of the second application.

2. The method of claim 1, wherein the data captured from the first application further includes data on user behavior in the first application.

3. The method of claim 1, wherein the data captured from the first application further includes characters a user selected in the first application.

4. The method of claim 1, wherein the data captured from the first application further includes one or more locations a user clicked in the first application.

5. The method of claim 1, wherein the data captured from the first application further includes one or more locations a user's cursor was located in the first application.

6. The method of claim 1, wherein the stored significance data is stored on a remote computer.

7. The method of claim 6, wherein the stored significance data is aggregated from more than one user.

8. The method of claim 1, the method further comprising:
updating, by the computer, the stored significance data based upon the segmentation of the data from the first application into blocks.

9. The method of claim 1, the method further comprising:
monitoring, by the computer, one or more search terms entered by a user into the search function of the second application.

10. The method of claim 9, the method further comprising:
updating, by the computer, the stored significance data based upon the search terms entered by the user into the search function of the second application.

11. The method of claim 1, wherein the stored significance data includes prior determinations of blocks for the first application.

12. The method of claim 11, wherein the stored significance data includes significance values for blocks.

13. The method of claim 11, wherein the stored significance data includes a number of times a block has resulted in a search by a user.

14. A computer program product for providing search suggestions, the computer program product comprising a computer readable storage medium having program instructions embodied therewith, wherein the computer readable storage medium is not a transitory signal per se, the program instructions executable by a computer to perform a method comprising the steps of:
capturing, by a computer, data from a first application, wherein the data includes data displayed on a screen by the first application;
segmenting, by the computer, the data from the first application into blocks, wherein the blocks correspond to areas displayed on the screen;
extracting, by the computer, words from the data from the first application;
generating, by the computer, tokens of phrases and singular words from the extracted words using natural language processing tokenization;
retrieving, by the computer, stored significance data for the first application, wherein the significance data is based upon a likelihood that a user will be presented with content in respective blocks that will be more likely to result in a search and wherein the stored significance data includes prior determinations of blocks for the first application;
scoring, by the computer, the blocks based upon the data from the first application, wherein the scoring of the blocks is further based upon the stored significance data;
scoring, by the computer, the tokens based upon the scoring of the blocks and the data from the first application; and
detecting, by the computer, a switch action from the first application to a second application, wherein the second application contains a search function;
providing, by the computer, the scored tokens to the search function of the second application.

15. The computer program product of claim 14, wherein the data captured from the first application further includes data on user behavior in the first application.

16. A system for providing search suggestions, the system comprising:
one or more processors; and
a memory communicatively coupled to the one or more processors,
wherein the memory comprises instructions which, when executed by the one or more processors, cause the one or more processors to perform a method comprising the steps of:
capturing, by a computer, data from a first application, wherein the data includes data displayed on a screen by the first application;
segmenting, by the computer, the data from the first application into blocks, wherein the blocks correspond to areas displayed on the screen;
extracting, by the computer, words from the data from the first application;
generating, by the computer, tokens of phrases and singular words from the extracted words using natural language processing tokenization;
retrieving, by the computer, stored significance data for the first application, wherein the significance data includes information used for determining respective blocks that will be more likely to result in a search;
scoring, by the computer, the blocks based upon the data from the first application, wherein the scoring of the blocks is further based upon the stored significance data;
scoring, by the computer, the tokens based upon the scoring of the blocks and the data from the first application; and
detecting, by the computer, a switch action from the first application to a second application, wherein the second application contains a search function;
providing, by the computer, the scored tokens to the search function of the second application.

17. The system of claim 16, wherein the data captured from the first application further includes data on user behavior in the first application.

18. The system of claim 16,
wherein the stored significance data includes prior determinations of blocks for the first application.

* * * * *